US012573835B2

(12) United States Patent
Mitani

(10) Patent No.: US 12,573,835 B2
(45) Date of Patent: Mar. 10, 2026

(54) POWER SUPPLY SYSTEM, AND MOVING OBJECT INCLUDING POWER SUPPLY SYSTEM

(71) Applicant: HONDA MOTOR CO., LTD., Tokyo (JP)

(72) Inventor: Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 18/619,979

(22) Filed: Mar. 28, 2024

(65) Prior Publication Data

US 2024/0332947 A1 Oct. 3, 2024

(30) Foreign Application Priority Data

Mar. 31, 2023 (JP) .................................. 2023-056886

(51) Int. Cl.
*H02H 3/16* (2006.01)
*H02J 3/36* (2006.01)

(52) U.S. Cl.
CPC ............... *H02H 3/162* (2013.01); *H02J 3/36* (2013.01); *H02J 2310/44* (2020.01)

(58) Field of Classification Search
CPC .. H02H 3/162; H02H 3/16; H02H 7/20; H02J 3/36; H02J 2310/44; G01R 31/52; G01R 19/145; G01R 31/50; G01R 19/165
See application file for complete search history.

(56) References Cited

U.S. PATENT DOCUMENTS

| | | | |
|---|---|---|---|
| 6,747,458 B2 * | 6/2004 | Huber | H02M 1/32 |
| | | | 324/509 |
| 10,330,716 B2 * | 6/2019 | Iwanabe | G01R 31/006 |
| 2006/0164102 A1 * | 7/2006 | Kramer | H02H 7/16 |
| | | | 324/548 |
| 2009/0289640 A1 * | 11/2009 | Kawamura | G01R 27/025 |
| | | | 324/658 |
| 2018/0224494 A1 | 8/2018 | Iwanabe et al. | |
| 2023/0077529 A1 * | 3/2023 | Lin | H02M 3/07 |
| | | | 323/271 |

FOREIGN PATENT DOCUMENTS

| | | | | |
|---|---|---|---|---|
| CN | 105954636 A | * | 9/2016 | G01R 31/58 |
| JP | 6-253449 A | | 9/1994 | |
| JP | 2005-348519 A | | 12/2005 | |
| JP | 6625586 B2 | | 12/2019 | |

* cited by examiner

*Primary Examiner* — Danny Nguyen
*Assistant Examiner* — Nicolas Bellido
(74) *Attorney, Agent, or Firm* — Rankin, Hill & Clark LLP

(57) ABSTRACT

A power supply system includes: a power supply circuit for supplying, to a load device, DC power output from a power source device; and a detection circuit capable of selectively performing ground fault detection for connecting the power supply circuit to a ground via a capacitor to detect whether or not the power supply circuit is short-circuited to the ground based on the voltage of the capacitor, and short circuit detection for connecting, via the capacitor, a positive wire provided in the power supply circuit to a negative wire provided in the power supply circuit to detect whether or not the positive wire and the negative wire are short-circuited based on the voltage of the capacitor.

7 Claims, 14 Drawing Sheets

10

<u>22</u>

<u>22</u>

22

F I G. 11
<u>22</u>
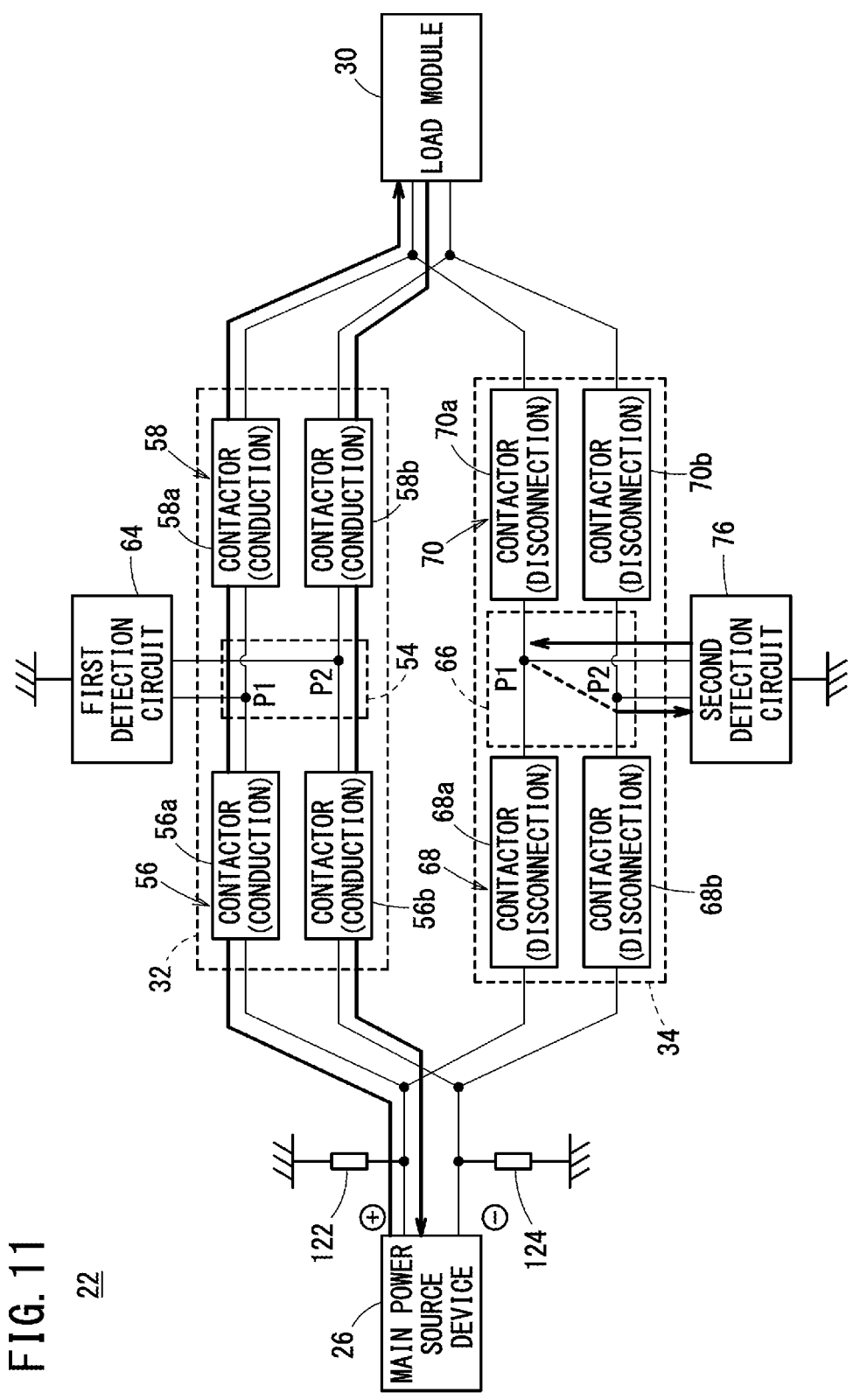

POWER SUPPLY SYSTEM, AND MOVING OBJECT INCLUDING POWER SUPPLY SYSTEM

CROSS-REFERENCE TO RELATED APPLICATIONS

This application is based upon and claims the benefit of priority from Japanese Patent Application No. 2023-056886 filed on Mar. 31, 2023, the contents of which are incorporated herein by reference.

BACKGROUND OF THE INVENTION

Field of the Invention

The present invention relates to a power supply system, and a moving object including the power supply system.

Description of the Related Art

In recent years, research and development have been conducted on electrification technology that contributes to energy efficiency in order to ensure that more people have access to affordable, reliable, sustainable and modern energy.

JP 2005-348519 A discloses a power supply system including a power source that is always used to supply electric power to a load, and an auxiliary power source that supplies electric power to the load when the power source that is always used fails. In the power supply system, the auxiliary power source is connected to the load via a power source switching control device including a voltage detector. In the power supply system, the voltage detector is connected to one of the auxiliary power source or the load in a state where electric power is supplied to the load from the power source that is always used. In the power supply system, an abnormality of the power source switching control device is determined according to the voltage detected by the voltage detector when the voltage detector is connected to the auxiliary power source, and the voltage detected by the voltage detector when the voltage detector is connected to the load.

SUMMARY OF THE INVENTION

There has been a demand for a more satisfactory power supply system.

The present invention has the object of solving the aforementioned problem.

A power supply system of the present invention comprises: a power supply circuit configured to supply, to a load device, direct current electric power output from a power source device; and a detection circuit configured to selectively perform ground fault detection and short circuit detection, wherein, in the ground fault detection, the detection circuit connects the power supply circuit to a ground via a capacitor to detect whether or not the power supply circuit is short-circuited to the ground based on a voltage of the capacitor, and in the short circuit detection, the detection circuit connects, via the capacitor, a positive wire provided in the power supply circuit to a negative wire provided in the power supply circuit to detect whether or not the positive wire and the negative wire are short-circuited based on the voltage of the capacitor.

A moving object of the present invention comprises the above-described power supply system.

According to the present invention, it is possible to provide a satisfactory power supply system, and a moving object including the satisfactory power supply system.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 11 is a schematic view of the power supply system;

FIG. 12 is a circuit diagram of the second detection circuit;

FIG. 14 is a circuit diagram of the second detection circuit.

DETAILED DESCRIPTION OF THE INVENTION

[Configuration of Aircraft]

Figure 1:
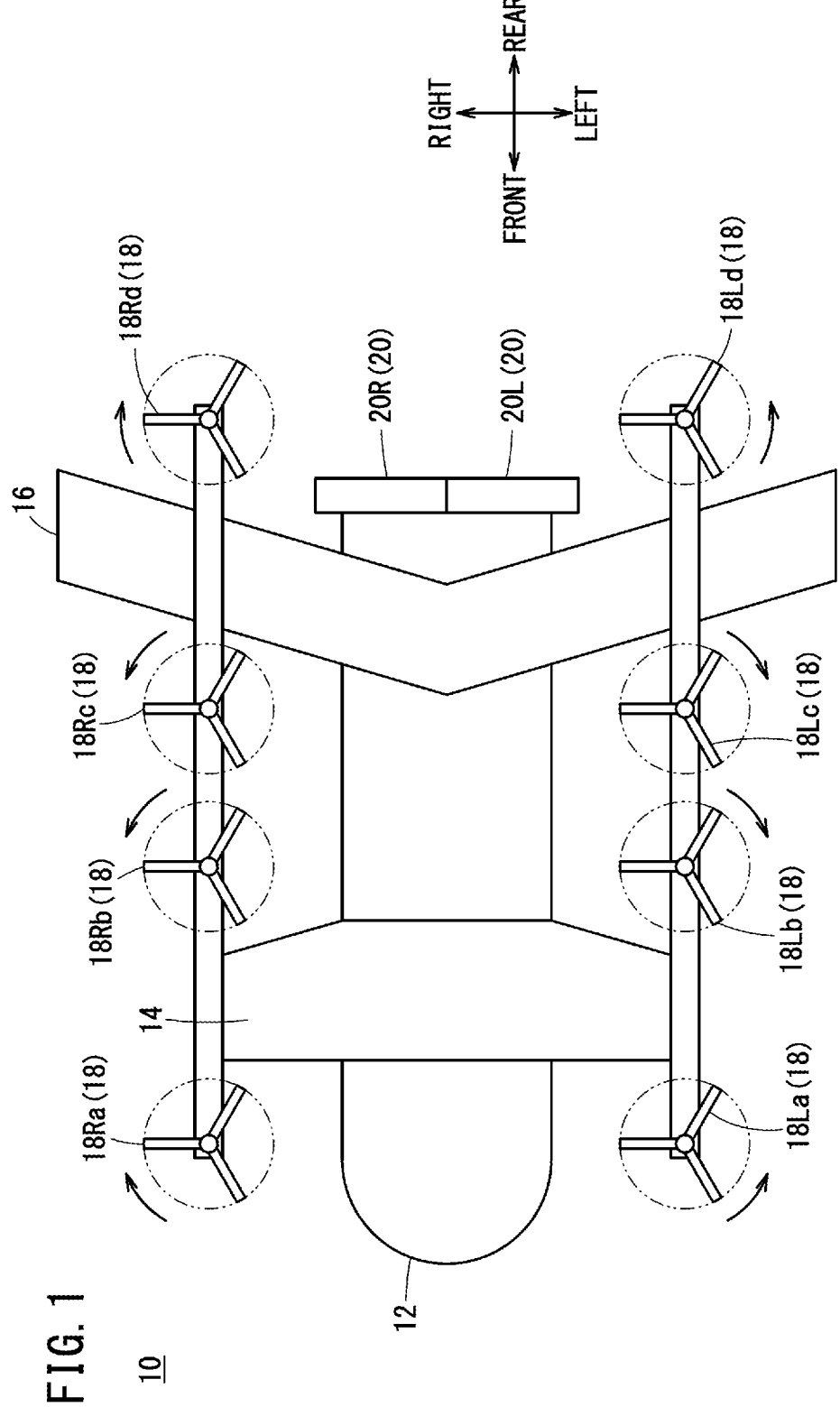
FIG. 1 is a schematic view of an aircraft.
Figure 2:
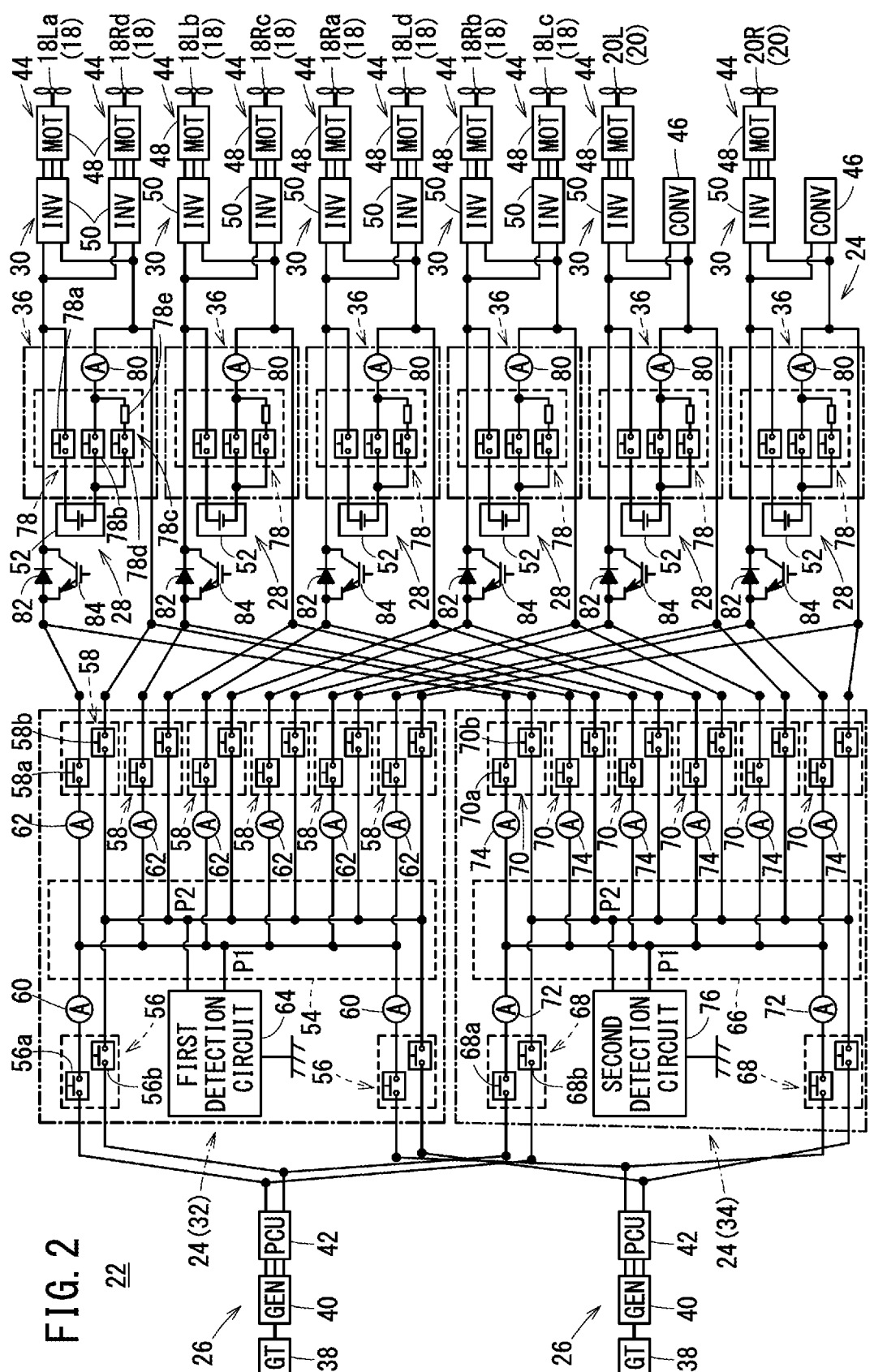
FIG. 2 is a schematic view showing a configuration of the power supply system.

FIG. 1 is a schematic view of an aircraft 10. The aircraft 10 of the present embodiment is an electric vertical take-off and landing aircraft (eVTOL aircraft). In the aircraft 10, rotors are driven by electric motors 48 (FIG. 2). The aircraft 10 generates thrust in the vertical direction and thrust in the horizontal direction using the rotors. Further, the aircraft 10 is a hybrid aircraft. The aircraft 10 includes a generator 40 (FIG. 2) and a battery 52 (FIG. 2) as power sources of the electric motor 48. In the aircraft 10, electric power generated by the generator 40 is supplied to the electric motor 48. When the electric power generated by the generator 40 is insufficient with respect to the required electric power, the electric power stored in the battery 52 is supplied to the electric motor 48.

The aircraft 10 includes a fuselage 12. The fuselage 12 is provided with a cockpit, a cabin, and the like (not shown). A pilot rides in the cockpit and controls the aircraft 10. Passengers and the like ride in the cabin. The aircraft 10 may be automatically controlled.

The aircraft 10 includes a front wing 14 and a rear wing 16. When the aircraft 10 moves forward, lift is generated in each of the front wing 14 and the rear wing 16.

The aircraft 10 includes eight VTOL rotors 18. The eight VTOL rotors 18 are a rotor 18La, a rotor 18Lb, a rotor 18Lc, a rotor 18Ld, a rotor 18Ra, a rotor 18Rb, a rotor 18Rc, and a rotor 18Rd.

The rotation shaft of each VTOL rotor 18 extends in the up-down direction of the fuselage 12. The thrust of each VTOL rotor 18 is controlled by adjusting the rotational speed of the rotor and the pitch angle of the blades. Each VTOL rotor 18 is used during vertical take-off, during transition from vertical take-off to cruising, during transition from cruising to vertical landing, during vertical landing, during hovering, and the like. Further, each VTOL rotor 18 is used during attitude control.

Lift thrust is generated by controlling the thrust of each VTOL rotor 18. The lift thrust indicates thrust in the vertical direction. The thrust of each VTOL rotor 18 is controlled to cause a roll moment, a pitch moment, and a yaw moment to act on the fuselage 12.

The aircraft 10 includes two cruise rotors 20. The two cruise rotors 20 are a rotor 20L and a rotor 20R. The rotor 20L and the rotor 20R are attached to the rear portion of the fuselage 12.

The rotation shaft of each cruise rotor 20 extends in the front-rear direction of the fuselage 12. The thrust of each cruise rotor 20 is controlled by adjusting the rotational speed of the rotor and the pitch angle of the blades. Each cruise rotor 20 is used during transition from vertical take-off to cruising, during cruising, during transition from cruising to vertical landing, and the like.

Cruise thrust is generated by controlling the thrust of each cruise rotor 20. The cruise thrust indicates thrust in the horizontal direction.

[Configuration of Power Supply System]

FIG. 2 is a schematic view showing a configuration of a power supply system 22. The power supply system 22 includes two power supply circuits 24, two main power source devices 26, and six auxiliary power source devices 28.

The power supply system 22 supplies electric power to each of six load modules 30 from both of the two main power source devices 26. The auxiliary power source device 28 is provided for each load module 30. When electric power supplied from the main power source devices 26 to the load modules 30 is insufficient, electric power is supplied from the auxiliary power source devices 28 to the load modules 30.

One of the two power supply circuits 24 is a first power supply circuit 32 (an additional power supply circuit). The other of the two power supply circuits 24 is a second power supply circuit 34 (a power supply circuit). The power supply system 22 includes the first power supply circuit 32, the second power supply circuit 34, and six auxiliary power supply circuits 36. The first power supply circuit 32 transmits DC power from the two main power source devices 26 to all the load modules 30. The second power supply circuit 34 transmits DC power from the two main power source devices 26 to all the load modules 30. The second power supply circuit 34 is provided in parallel with the first power supply circuit 32.

The auxiliary power supply circuit 36 is provided for each auxiliary power source device 28. Each auxiliary power supply circuit 36 is connected to each auxiliary power source device 28. Each auxiliary power supply circuit 36 is connected to both the first power supply circuit 32 and the second power supply circuit 34. Each auxiliary power supply circuit 36 transmits DC power from each auxiliary power source device 28 to each load module 30. Each auxiliary power supply circuit 36 transmits DC power from each auxiliary power source device 28 to both the first power supply circuit 32 and the second power supply circuit 34.

Each main power source device 26 includes a gas turbine 38, the generator 40, and a power control unit (hereinafter referred to as PCU) 42. The gas turbine 38 drives the generator 40. As a result, the generator 40 generates electric power. The PCU 42 converts the AC power generated by the generator 40 into DC power, and outputs the DC power to the power supply circuit 24.

When the gas turbine 38 is started, the PCU 42 converts the DC power supplied from the power supply circuit 24 into AC power, and outputs the AC power to the generator 40. The generator 40 is operated by the electric power input from the PCU 42, and the generator 40 drives the gas turbine 38.

Among the six load modules 30, four load modules 30 each include two drive units 44. The other two load modules 30 each include one drive unit 44 and one converter 46. The drive unit 44 drives each VTOL rotor 18 or each cruise rotor 20.

Each drive unit 44 includes the electric motor 48 and an inverter 50. The electric motor 48 is a three-phase motor. Each VTOL rotor 18 is coupled to the output shaft of each electric motor 48. Each cruise rotor 20 is coupled to the output shaft of each electric motor 48. The inverter 50 converts the DC power supplied from the power supply circuit 24 into three-phase AC power, and outputs the three-phase AC power to the electric motor 48.

The converter 46 steps down the voltage of the DC power supplied from the power supply circuit 24, and outputs the stepped-down voltage to a device operated by DC power. The device operated by DC power is, for example, a cooling device that cools the power supply circuit 24, the PCU 42, the inverter 50, and the like. The device operated by DC power is, for example, an electronic control unit (ECU) that controls the power supply circuit 24, the gas turbine 38, the PCU 42, the inverter 50, and the like.

Each auxiliary power source device 28 includes the battery 52. The battery 52 is charged with electric power supplied from the main power source device 26. Further, electric power charged in the battery 52 is supplied to the load module 30.

The first power supply circuit 32 includes a power transmission bus 54, two contactor devices 56, six contactor devices 58, two current sensors 60, and six current sensors 62.

The two main power source devices 26 are connected in parallel to each other by the power transmission bus 54. The six load modules 30 are connected in parallel to each other by the power transmission bus 54.

Each contactor device 56 is provided between each main power source device 26 and the power transmission bus 54. The contactor device 56 includes a contactor 56a and a contactor 56b. The contactor 56a is provided on a positive wire of the first power supply circuit 32. The contactor 56b is provided on a negative wire of the first power supply circuit 32.

The contactor 56a switches between a connection state in which a positive wire of the power transmission bus 54 is connected to the main power source device 26, and a disconnection state in which the positive wire of the power transmission bus 54 is disconnected from the main power source device 26. The contactor 56b switches between a state in which a negative wire of the power transmission bus 54 is connected to the main power source device 26, and a state in which the negative wire of the power transmission bus 54 is disconnected from the main power source device 26.

Each contactor device 58 is provided between each load module 30 and the power transmission bus 54. The contactor device 58 includes a contactor 58a and a contactor 58b. The contactor 58a is provided on the positive wire of the first power supply circuit 32. The contactor 58*b* is provided on the negative wire of the first power supply circuit 32.

The contactor 58*a* switches between a state in which the positive wire of the power transmission bus 54 is connected to the load module 30, and a state in which the positive wire of the power transmission bus 54 is disconnected from the load module 30. The contactor 58*b* switches between a state in which the negative wire of the power transmission bus 54 is connected to the load module 30, and a state in which the negative wire of the power transmission bus 54 is disconnected from the load module 30.

Each current sensor 60 is provided between each contactor device 56 and the power transmission bus 54. The current sensor 60 is provided on the positive wire of the first power supply circuit 32. Each current sensor 62 is provided between each contactor device 58 and the power transmission bus 54. The current sensor 62 is provided on the positive wire of the first power supply circuit 32.

A first detection circuit 64 is connected to the power transmission bus 54. The first detection circuit 64 switches between a state in which one of the positive wire or the negative wire of the power transmission bus 54 is connected to a reference potential, and a state in which both of the positive wire and the negative wire of the power transmission bus 54 are disconnected from the reference potential. The connection to the reference potential specifically means connection to the fuselage 12 (a ground). The configuration of the first detection circuit 64 will be described later.

The second power supply circuit 34 includes a power transmission bus 66, two contactor devices 68, six contactor devices 70, two current sensors 72, and six current sensors 74.

The two main power source devices 26 are connected in parallel to each other by the power transmission bus 66. The six load modules 30 are connected in parallel to each other by the power transmission bus 66.

Each contactor device 68 is provided between each main power source device 26 and the power transmission bus 66. The contactor device 68 includes a contactor 68*a* and a contactor 68*b*. The contactor 68*a* is provided on a positive wire of the second power supply circuit 34. The contactor 68*b* is provided on a negative wire of the second power supply circuit 34.

The contactor 68*a* switches between a connection state in which a positive wire of the power transmission bus 66 is connected to the main power source device 26, and a disconnection state in which the positive wire of the power transmission bus 66 is disconnected from the main power source device 26. The contactor 68*b* switches between a state in which a negative wire of the power transmission bus 66 is connected to the main power source device 26, and a state in which the negative wire of the power transmission bus 66 is disconnected from the main power source device 26.

Each contactor device 70 is provided between each load module 30 and the power transmission bus 66. The contactor device 70 includes a contactor 70*a* and a contactor 70*b*. The contactor 70*a* is provided on the positive wire of the second power supply circuit 34. The contactor 70*b* is provided on the negative wire of the second power supply circuit 34.

The contactor 70*a* switches between a state in which the positive wire of the power transmission bus 66 is connected to the load module 30, and a state in which the positive wire of the power transmission bus 66 is disconnected from the load module 30. The contactor 70*b* switches between a state in which the negative wire of the power transmission bus 66 is connected to the load module 30, and a state in which the negative wire of the power transmission bus 66 is disconnected from the load module 30.

Each current sensor 72 is provided between each contactor device 68 and the power transmission bus 66. The current sensor 72 is provided on the positive wire of the second power supply circuit 34. Each current sensor 74 is provided between each contactor device 70 and the power transmission bus 66. The current sensor 74 is provided on the positive wire of the second power supply circuit 34.

A second detection circuit 76 is connected to the power transmission bus 66. The second detection circuit 76 switches between a state in which one of the positive wire or the negative wire of the power transmission bus 66 is connected to the reference potential, and a state in which both of the positive wire and the negative wire of the power transmission bus 66 are disconnected from the reference potential. The configuration of the second detection circuit 76 will be described later in detail together with the configuration of the first detection circuit 64.

Each auxiliary power supply circuit 36 includes a contactor device 78 and a current sensor 80. The contactor device 78 includes a contactor 78*a*, a contactor 78*b*, and a precharge circuit 78*c*. The contactor 78*a* is provided on a positive wire of the auxiliary power supply circuit 36. The contactor 78*b* is provided on a negative wire of the auxiliary power supply circuit 36. The precharge circuit 78*c* is provided in parallel with the contactor 78*b*. The precharge circuit 78*c* includes a contactor 78*d* and a resistor 78*e*. The current sensor 80 is provided on the negative wire of the auxiliary power supply circuit 36.

The contactor 78*a* switches between a state in which a positive electrode of the auxiliary power source device 28 is connected to the first power supply circuit 32, the second power supply circuit 34, and each load module 30, and a state in which the positive electrode of the auxiliary power source device 28 is disconnected from the first power supply circuit 32, the second power supply circuit 34, and each load module 30. The contactor 78*b* switches between a state in which a negative electrode of the auxiliary power source device 28 is connected to the first power supply circuit 32, the second power supply circuit 34, and each load module 30, and a state in which the negative electrode of the auxiliary power source device 28 is disconnected from the first power supply circuit 32, the second power supply circuit 34, and each load module 30. The contactor 78*d* switches between a state in which the negative electrode of the auxiliary power source device 28 is connected to the resistor 78*e*, and a state in which the negative electrode of the auxiliary power source device 28 is disconnected from the resistor 78*e*.

A diode 82 is provided between the first power supply circuit 32 and each auxiliary power supply circuit 36. That is, the diode 82 is provided between the second power supply circuit 34 and each auxiliary power supply circuit 36. An anode of each diode 82 is connected to the first power supply circuit 32 and the second power supply circuit 34, and a cathode of each diode 82 is connected to the auxiliary power supply circuit 36. Each diode 82 allows electric power to be supplied from the first power supply circuit 32 and the second power supply circuit 34 to each auxiliary power supply circuit 36. Each diode 82 prevents the supply of electric power from each auxiliary power supply circuit 36 to the first power supply circuit 32 and the second power supply circuit 34.

Thus, electric power is supplied from the main power source devices 26 to each auxiliary power source device 28 via each diode 82. As a result, the battery 52 of each auxiliary power source device 28 is charged. Further, when the first power supply circuit 32 or the second power supply circuit 34 is short-circuited, the electric power of each auxiliary power source device 28 is prevented from flowing to the first power supply circuit 32 or the second power supply circuit 34. As a result, even when the first power supply circuit 32 or the second power supply circuit 34 is short-circuited, electric power can be supplied from each auxiliary power source device 28 to the drive unit 44 and the converter 46 in each load module 30.

A transistor 84 is provided in parallel with each diode 82. When the transistor 84 is ON, electric power is supplied from each auxiliary power source device 28 to the first power supply circuit 32 and the second power supply circuit 34 while bypassing the diode 82.

[Configuration of Detection Circuit]

Figure 3:
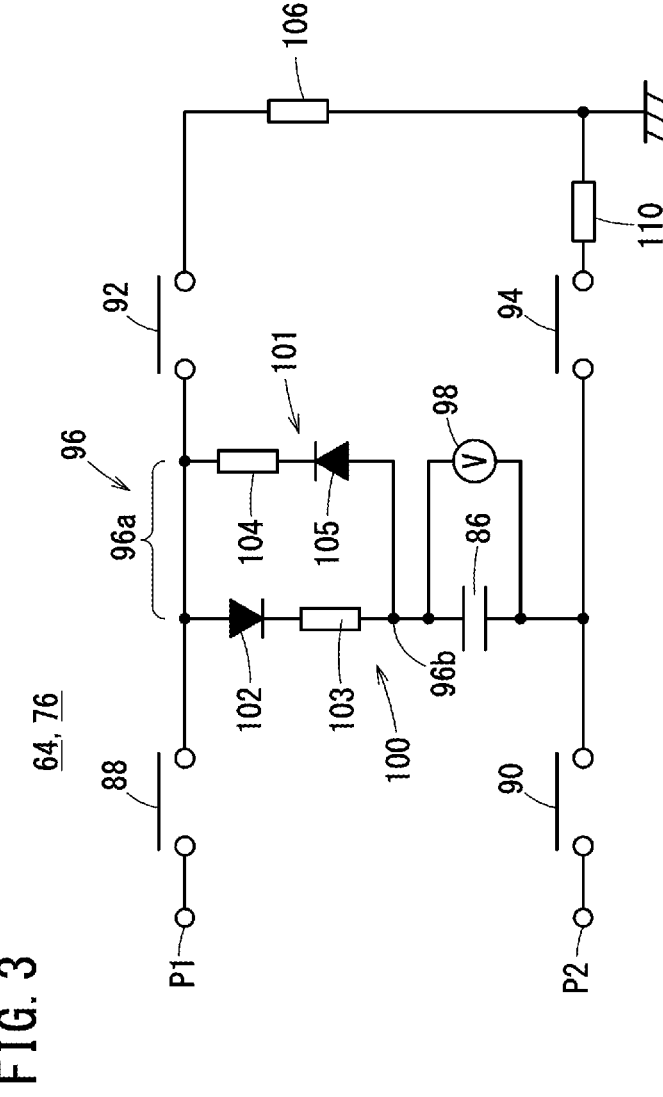
FIG. 3 is a circuit diagram of a first detection circuit and a second detection circuit.

FIG. 3 is a circuit diagram of the first detection circuit 64 and the second detection circuit 76. The first detection circuit 64 and the second detection circuit 76 have the same configuration.

Each of the first detection circuit 64 and the second detection circuit 76 includes a capacitor 86 that operates as a flying capacitor. Each of the first detection circuit 64 and the second detection circuit 76 includes a switching element 88 (a first switch), a switching element 90 (a second switch), a switching element 92 (a third switch), and a switching element 94 (a fourth switch). The switching elements 88, the switching elements 90, the switching elements 92, and the switching elements 94 switch the path of the current flowing through the first detection circuit 64 and the second detection circuit 76. Each of the first detection circuit 64 and the second detection circuit 76 includes a partial circuit 96. Each of the first detection circuit 64 and the second detection circuit 76 includes a voltage sensor 98 capable of measuring a voltage between terminals (Vc) of the capacitor 86.

The partial circuit 96 includes a first partial circuit 100 and a second partial circuit 101. The first partial circuit 100 and the second partial circuit 101 are interposed between a first end 96a and a second end 96b of the partial circuit 96. The first partial circuit 100 includes a first diode 102 and a first resistor 103. The first diode 102 and the first resistor 103 are connected in series to each other. The first diode 102 can allow a current to flow from the first end 96a to the second end 96b. The second partial circuit 101 is connected in parallel to the first partial circuit 100. The second partial circuit 101 includes a second resistor 104 and a second diode 105. The second resistor 104 and the second diode 105 are connected in series to each other. The second diode 105 can allow a current to flow from the second end 96b to the first end 96a.

Each of the switching element 88, the switching element 90, the switching element 92, and the switching element 94 is constituted by an insulated switching element such as an optical metal oxide semiconductor field effect transistor (MOSFET).

One end of the switching element 88 is connected to a point P1 (FIG. 2) of the positive wire of the power transmission bus 54 or a point P1 (FIG. 2) of the positive wire of the power transmission bus 66. The other end of the switching element 88 is connected to the first end 96a of the partial circuit 96. The second end 96b of the partial circuit 96 is connected to a first terminal of the capacitor 86.

One end of the switching element 90 is connected to a point P2 (FIG. 2) of the negative wire of the power transmission bus 54 or a point P2 (FIG. 2) of the negative wire of the power transmission bus 66. The other end of the switching element 90 is connected to a second terminal of the capacitor 86.

One end of the switching element 92 is connected to the first end 96a of the partial circuit 96. The other end of the switching element 92 is connected to one end of a third resistor 106. The other end of the third resistor 106 is connected to the reference potential.

One end of the switching element 94 is connected to the second terminal of the capacitor 86. The other end of the switching element 94 is connected to one end of a fourth resistor 110. The other end of the fourth resistor 110 is connected to the reference potential.

The first detection circuit 64 can selectively perform ground fault detection and short circuit detection for the first power supply circuit 32. Specifically, in the first detection circuit 64, the first power supply circuit 32 and the ground can be connected to each other via the capacitor 86. Further, the first detection circuit 64 can detect whether or not the first power supply circuit 32 is short-circuited to the ground, based on the voltage between the terminals (Vc) of the capacitor 86. In the first detection circuit 64, the positive wire provided in the first power supply circuit 32 and the negative wire provided in the first power supply circuit 32 can be connected to each other via the capacitor 86. Further, the first detection circuit 64 can detect whether or not the positive wire and the negative wire are short-circuited, based on the voltage of the capacitor 86.

On the other hand, the second detection circuit 76 can selectively perform ground fault detection and short circuit detection for the second power supply circuit 34. Specifically, in the second detection circuit 76, the second power supply circuit 34 and the ground can be connected to each other via the capacitor 86. Further, the second detection circuit 76 can detect whether or not the second power supply circuit 34 is short-circuited to the ground, based on the voltage between the terminals (Vc) of the capacitor 86. In the second detection circuit 76, the positive wire provided in the second power supply circuit 34 and the negative wire provided in the second power supply circuit 34 can be connected to each other via the capacitor 86. Further, the second detection circuit 76 can detect whether or not the positive wire and the negative wire are short-circuited, based on the voltage of the capacitor 86.

[Configuration of Control Device]

Figure 4:
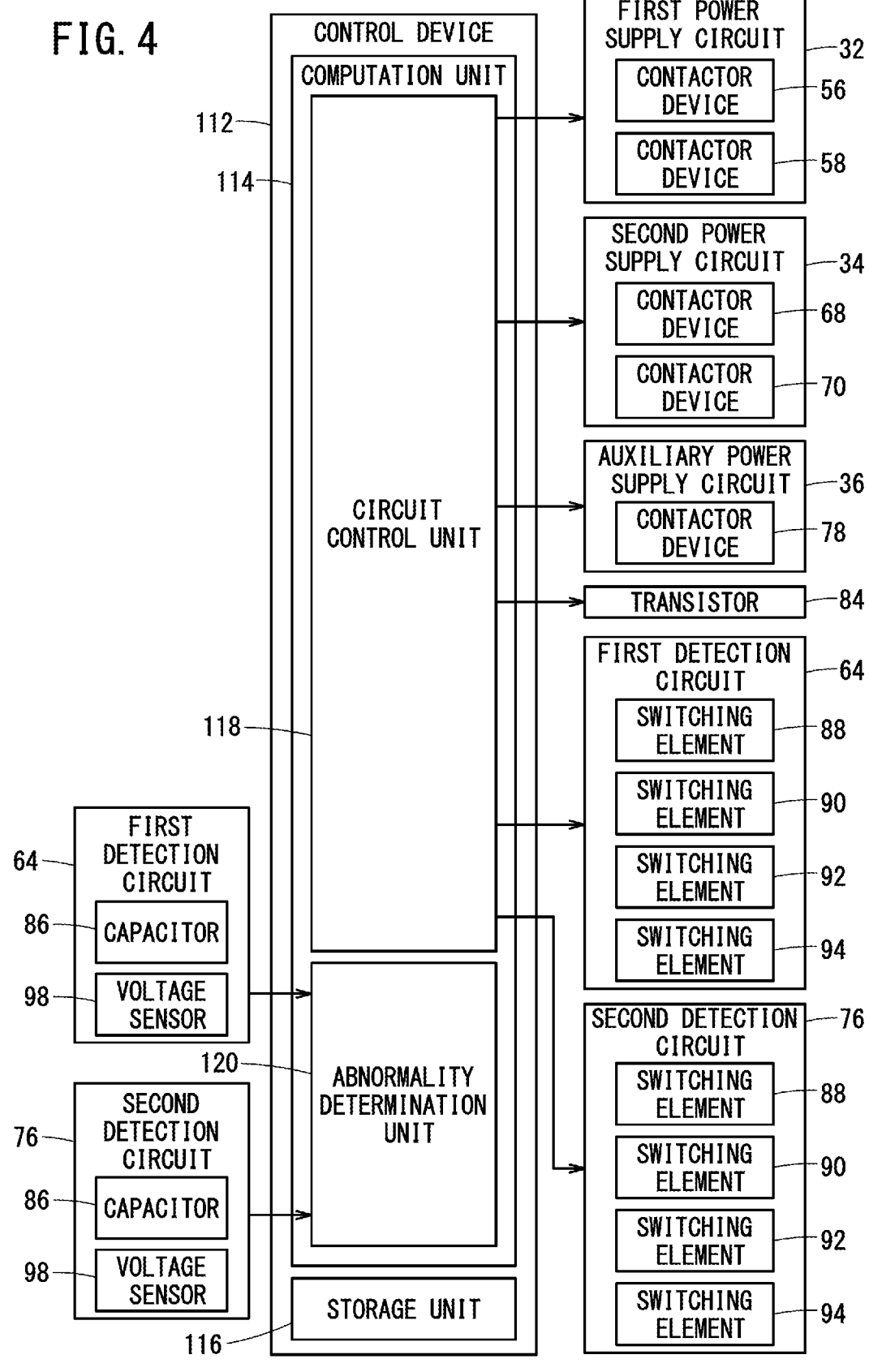
FIG. 4 is a block diagram showing a configuration of a control device.

FIG. 4 is a block diagram showing a configuration of a control device 112. The control device 112 includes a computation unit 114 and a storage unit 116. The computation unit 114 is, for example, a processor such as a central processing unit (CPU) or a graphics processing unit (GPU). The computation unit 114 includes a circuit control unit 118 and an abnormality determination unit 120. The circuit control unit 118 and the abnormality determination unit 120 are each realized by the computation unit 114 executing a program stored in the storage unit 116. At least part of the circuit control unit 118 and the abnormality determination unit 120 may be realized by an integrated circuit such as an application specific integrated circuit (ASIC) or a field-programmable gate array (FPGA). At least part of the circuit control unit 118 and the abnormality determination unit 120 may be realized by an electronic circuit including a discrete device.

The storage unit 116 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage unit 116 may be included in the processor, the integrated circuit, or the like described above.

The circuit control unit 118 controls the contactor devices 56 and the contactor devices 58 of the first power supply circuit 32, the contactor devices 68 and the contactor devices 70 of the second power supply circuit 34, the contactor devices 78 of the auxiliary power supply circuits 36, and the transistors 84. The circuit control unit 118 controls the switching element 88, the switching element 90, the switching element 92, and the switching element 94 of the first detection circuit 64, and the switching element 88, the switching element 90, the switching element 92, and the switching element 94 of the second detection circuit 76.

The abnormality determination unit 120 determines whether or not an abnormality has occurred in the power transmission bus 54 and the power transmission bus 66, based on the voltage between the terminals of the capacitor 86 of the first detection circuit 64 (the detection value of the voltage sensor 98) and the voltage between the terminals of the capacitor 86 of the second detection circuit 76 (the detection value of the voltage sensor 98).

[Inspection of Power Supply Circuit]

The computation unit 114 can execute the inspection of the first power supply circuit 32 and the second power supply circuit 34 at a predetermined timing or at a predetermined cycle. For example, the computation unit 114 executes a ground fault inspection process, and determines whether or not a ground fault has occurred in at least one of the first power supply circuit 32 or the second power supply circuit 34. In the ground fault inspection process, the computation unit 114 determines the presence or absence of a ground fault by detecting the voltage between the terminals of the capacitor 86 using the voltage sensor 98. The computation unit 114 can execute the ground fault inspection process by a known method. A specific method for the ground fault inspection process is disclosed in, for example, JP 6625586 B2. Therefore, in the present specification, the description of the ground fault inspection process will be omitted.

[Short Circuit Inspection Process]

Figure 5:
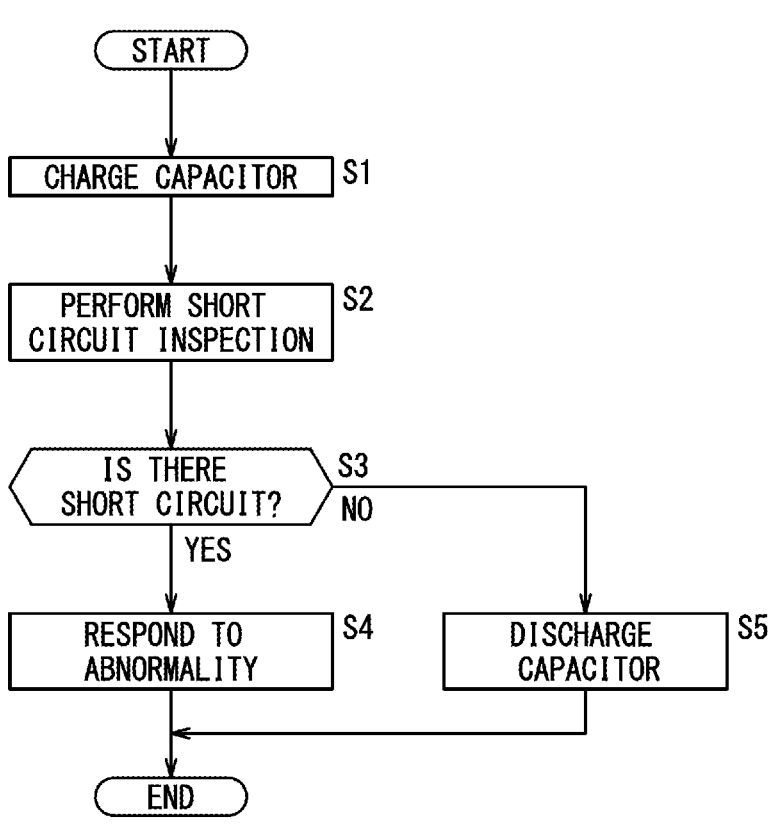
FIG. 5 is a flowchart of a short circuit inspection process.

FIG. 5 is a flowchart of a short circuit inspection process. The computation unit 114 executes the short circuit inspection process, and determines whether or not a short circuit has occurred in the second power supply circuit 34. The computation unit 114 executes the short circuit inspection process for the second power supply circuit 34 in a state where DC power is supplied from the first power supply circuit 32 to the load module 30 and DC power is not supplied from the second power supply circuit 34 to the load module 30.

In step S1, the circuit control unit 118 charges the capacitor 86 of the second detection circuit 76 by controlling the on/off of the contactor device 68 and the contactor device 70, and also controlling the on/off of the switching element 88, the switching element 90, the switching element 92, and the switching element 94 of the second detection circuit 76. The method of charging the capacitor 86 will be described later in detail.

In step S2, the circuit control unit 118 performs a short circuit inspection for the second power supply circuit 34 by controlling the on/off of the contactor device 68 and the contactor device 70, and also controlling the on/off of the switching element 88, the switching element 90, the switching element 92, and the switching element 94 of the second detection circuit 76. The method of the short circuit inspection will be described later in detail.

In step S3, the abnormality determination unit 120 determines whether or not the second power supply circuit 34 is short-circuited, based on the result of the short circuit inspection performed in step S2. When the second power supply circuit 34 is short-circuited (step S3: YES), the process proceeds to step S4. On the other hand, when the second power supply circuit 34 is not short-circuited (step S3: NO), the process proceeds to step S5.

When the process proceeds from step S3 to step S4, the abnormality determination unit 120 responds to the abnormality. For example, the abnormality determination unit 120 outputs a control signal for instructing a display device (not shown) to provide notification. The display device displays a message indicating that the second power supply circuit 34 is short-circuited. When step S4 is ended, the short circuit inspection process is ended.

On the other hand, when the process proceeds from step S3 to step S5, the circuit control unit 118 discharges the capacitor 86 of the second detection circuit 76 by controlling the on/off of the contactor device 68 and the contactor device 70, and also controlling the on/off of the switching element 88, the switching element 90, the switching element 92, and the switching element 94 of the second detection circuit 76. The method of discharging the capacitor 86 will be described later in detail. When step S5 is ended, the short circuit inspection process is ended.

[First Method of Charging Capacitor]

Figure 6:
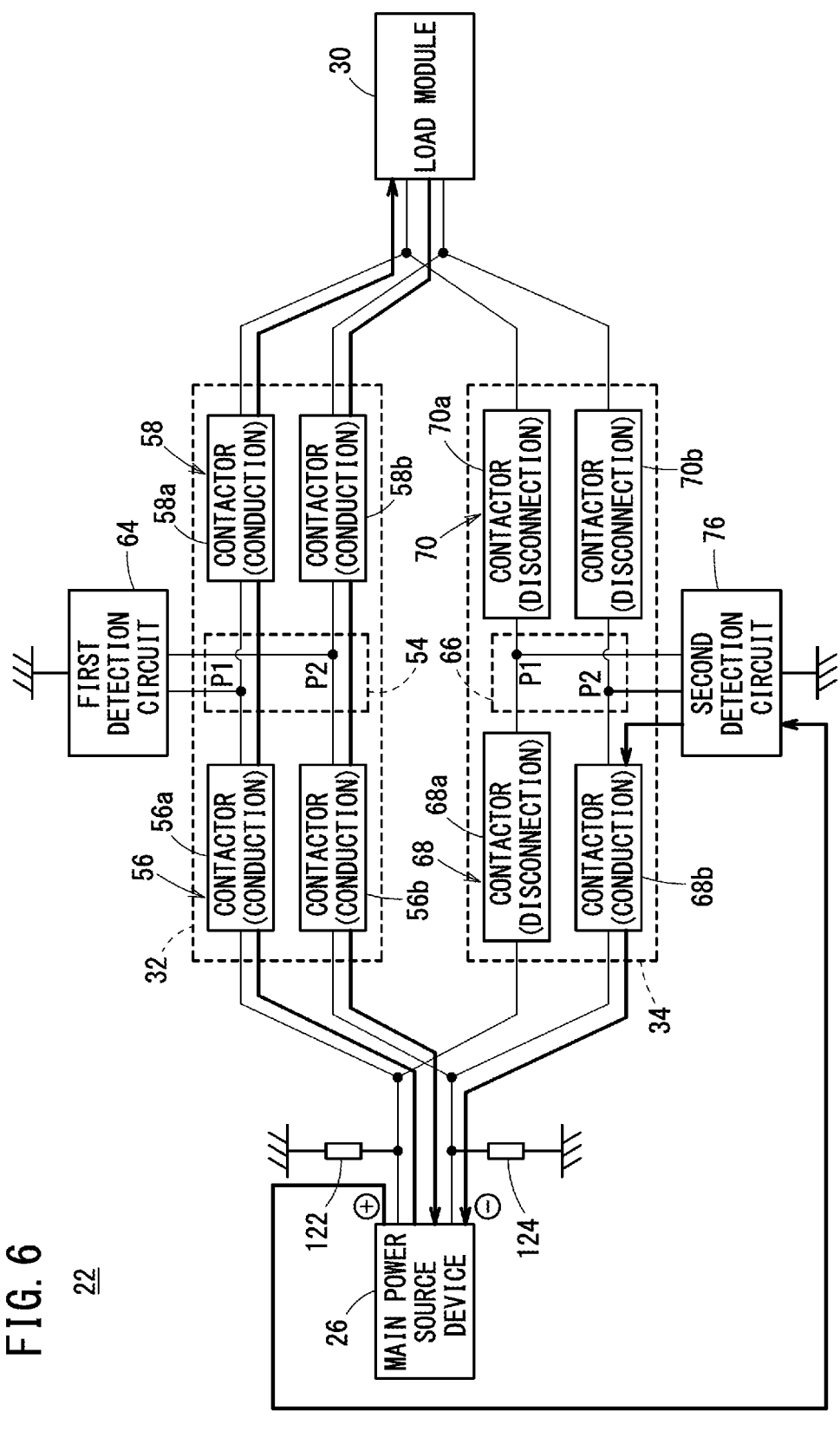
FIG. 6 is a schematic view of the power supply system.

In step S1 shown in FIG. 5, the capacitor 86 may be charged by a first method described below. FIG. 6 is a schematic view of the power supply system 22. FIG. 6 schematically shows the circuit configuration of the first power supply circuit 32 and the circuit configuration of the second power supply circuit 34 between one main power source device 26 and one load module 30. When there are two or more main power source devices 26, each of the main power source devices 26 is connected in parallel to the first power supply circuit 32 and the second power supply circuit 34. Similarly, when there are two or more load modules 30, each of the load modules 30 is connected in parallel to the first power supply circuit 32 and the second power supply circuit 34.

As described above, the short circuit inspection process for the second power supply circuit 34 is executed in a state where DC power is supplied from the first power supply circuit 32 to the load module 30. That is, as shown in FIG. 6, during the execution of the short circuit inspection process for the second power supply circuit 34, each of the contactor 56a, the contactor 56b, the contactor 58a, and the contactor 58b is controlled to be in a conductive state in the first power supply circuit 32. Further, although not shown, the switching element 88, the switching element 90, the switching element 92, and the switching element 94 are controlled to be in a disconnection state in the first detection circuit 64.

Arrows shown in FIG. 6 indicate the flow of the current in the first power supply circuit 32, the second power supply circuit 34, and the second detection circuit 76. A resistor 122 indicates an insulating resistance between the positive electrode of the main power source device 26 and the fuselage 12. A resistor 124 indicates an insulating resistance between the negative electrode of the main power source device 26 and the fuselage 12.

As described above, the circuit control unit 118 controls the on/off of the contactor device 68 and the contactor device 70 in order to charge the capacitor 86. Here, as shown in FIG. 6, in the second power supply circuit 34, only the contactor 68b is controlled to be in the conductive state. That is, each of the contactor 68a, the contactor 70a, and the contactor 70b is controlled to be in the disconnection state.

Figure 7:
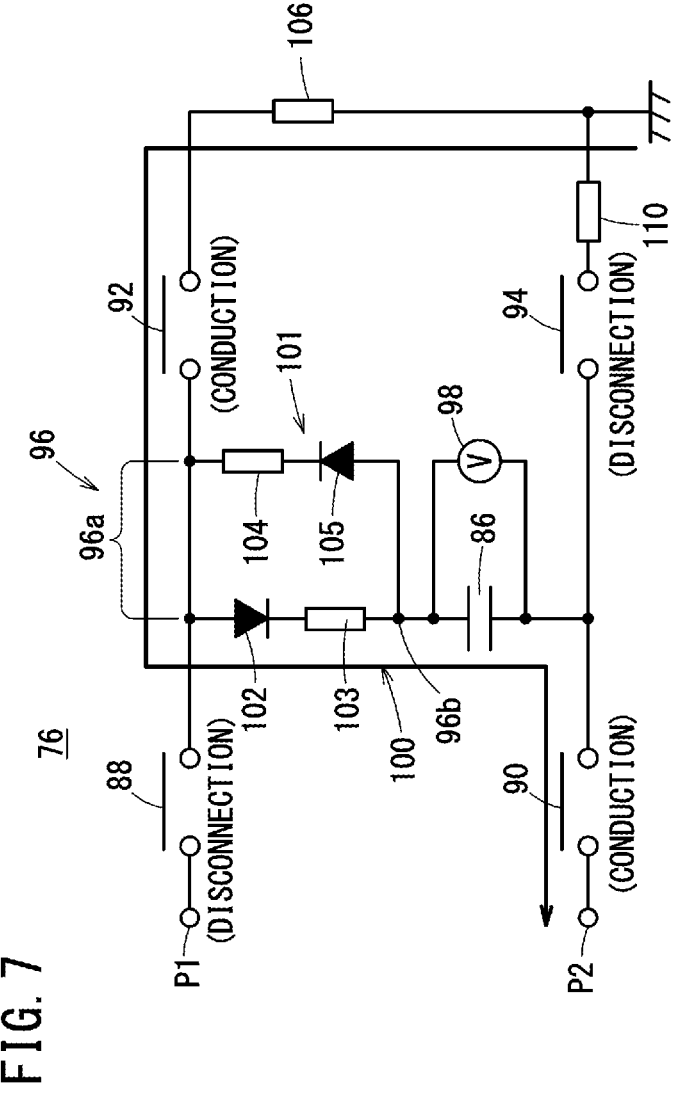
FIG. 7 is a circuit diagram of the second detection circuit.

FIG. 7 is a circuit diagram of the second detection circuit 76. Arrows shown in FIG. 7 indicate the flow of the current in the second detection circuit 76. The circuit control unit 118 controls the on/off of each switch in order to charge the capacitor 86. Here, as shown in FIG. 7, the switching element 90 and the switching element 92 of the second detection circuit 76 are controlled to be in the conductive state. The switching element 88 and the switching element 94 of the second detection circuit 76 are controlled to be in the disconnection state.

Thus, the negative wire of the second power supply circuit 34 is connected to the reference potential. In this case, since the resistance value of the first resistor 103 is relatively large, a large current does not flow into the second detection circuit 76. The capacitor 86 of the second detection circuit 76 is charged with the DC power supplied to the second detection circuit 76. When the charging of the capacitor 86 is completed, no current flows through the second detection circuit 76. Therefore, the amount of electric power supplied from the power transmission bus 66 to the second detection circuit 76 can be suppressed.

[Second Method of Charging Capacitor]

Figure 8:
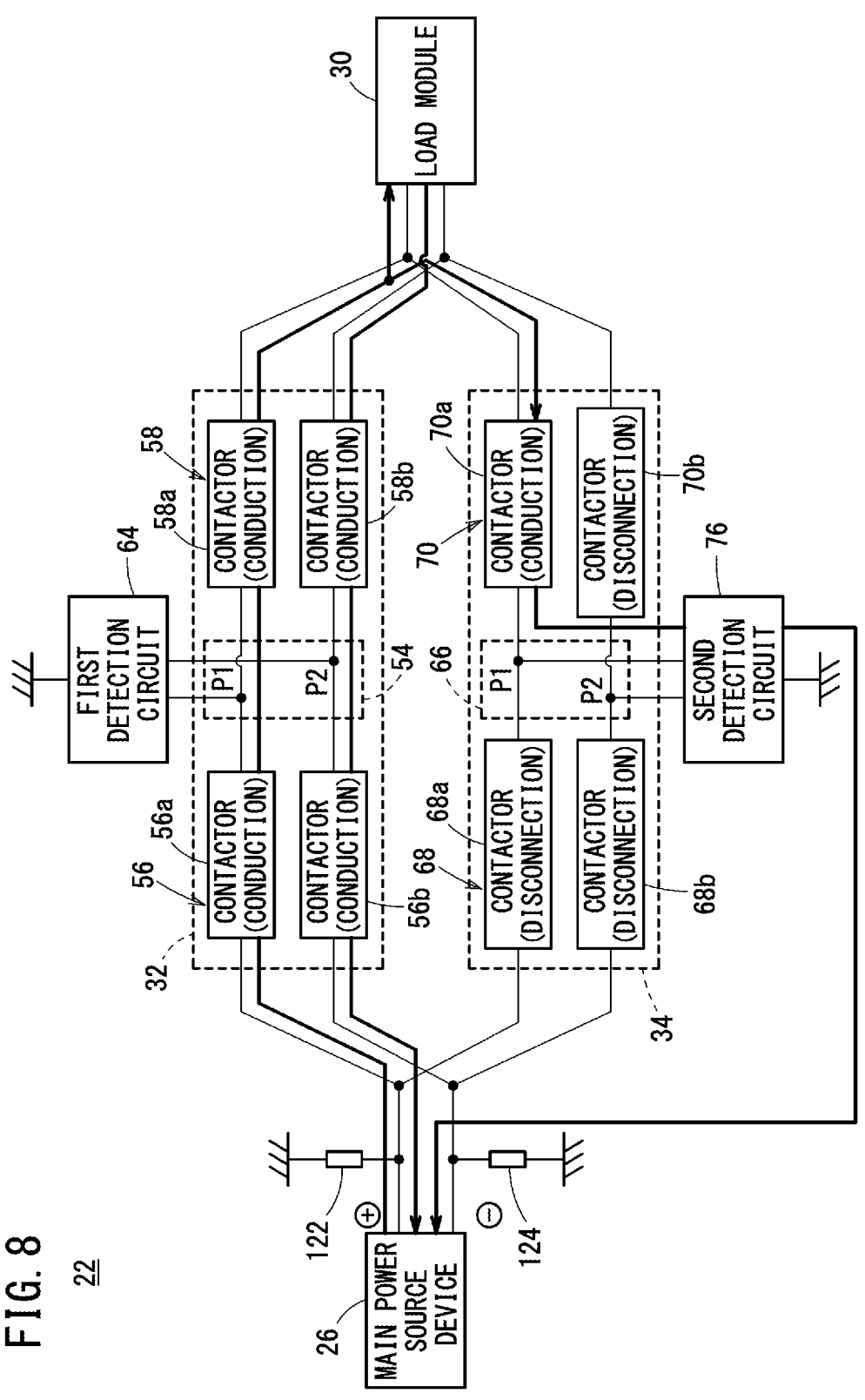
FIG. 8 is a schematic view of the power supply system.

In step S1 shown in FIG. 5, the capacitor 86 may be charged by a second method described below. FIG. 8 is a schematic view of the power supply system 22. Arrows shown in FIG. 8 indicate the flow of the current in the first power supply circuit 32, the second power supply circuit 34, and the second detection circuit 76. FIG. 8 shows a conduction path different from the conduction path shown in FIG. 6.

As described above, the circuit control unit 118 controls the on/off of the contactor device 68 and the contactor device 70 in order to charge the capacitor 86. Here, as shown in FIG. 8, in the second power supply circuit 34, only the contactor 70a is controlled to be in the conductive state. That is, each of the contactor 68a, the contactor 68b, and the contactor 70b is controlled to be in the disconnection state.

Figure 9:
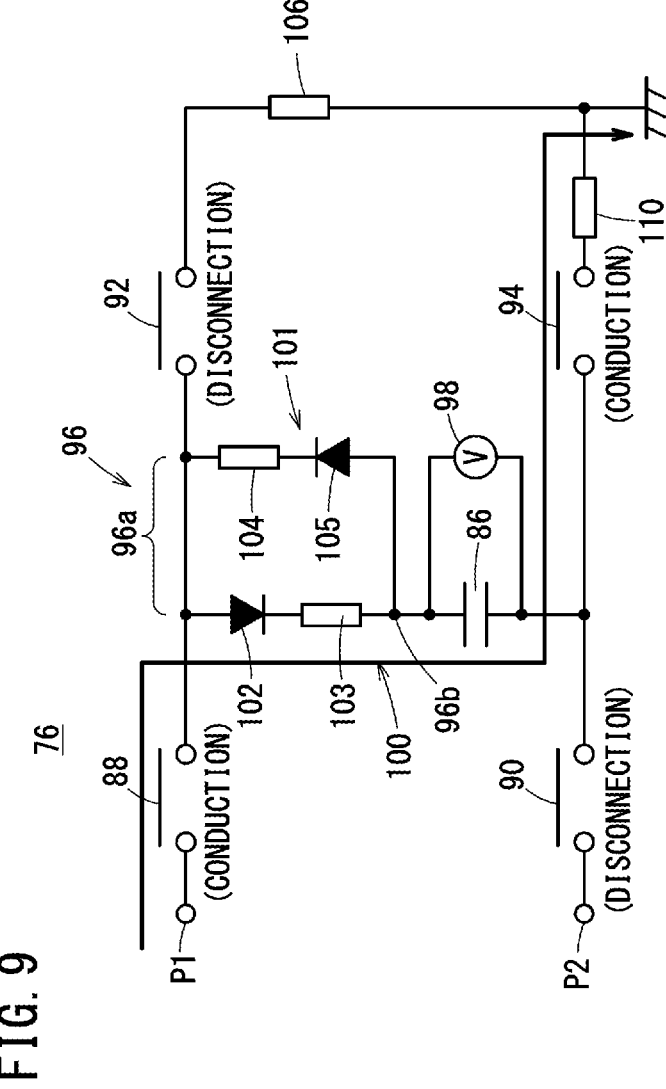
FIG. 9 is a circuit diagram of the second detection circuit.

FIG. 9 is a circuit diagram of the second detection circuit 76. Arrows shown in FIG. 9 indicate the flow of the current in the second detection circuit 76. The circuit control unit 118 controls the on/off of each switch in order to charge the capacitor 86. Here, as shown in FIG. 9, the switching element 88 and the switching element 94 of the second detection circuit 76 are controlled to be in the conductive state. The switching element 90 and the switching element 92 of the second detection circuit 76 are controlled to be in the disconnection state.

Thus, the positive wire of the second power supply circuit 34 is connected to the reference potential. In this case, since the resistance value of the first resistor 103 is relatively large, a large current does not flow into the second detection circuit 76. The capacitor 86 of the second detection circuit 76 is charged with the DC power supplied to the second detection circuit 76. When the charging of the capacitor 86 is completed, no current flows through the second detection circuit 76. Therefore, the amount of electric power supplied from the power transmission bus 66 to the second detection circuit 76 can be suppressed.

[Third Method of Charging Capacitor]

Figure 10:
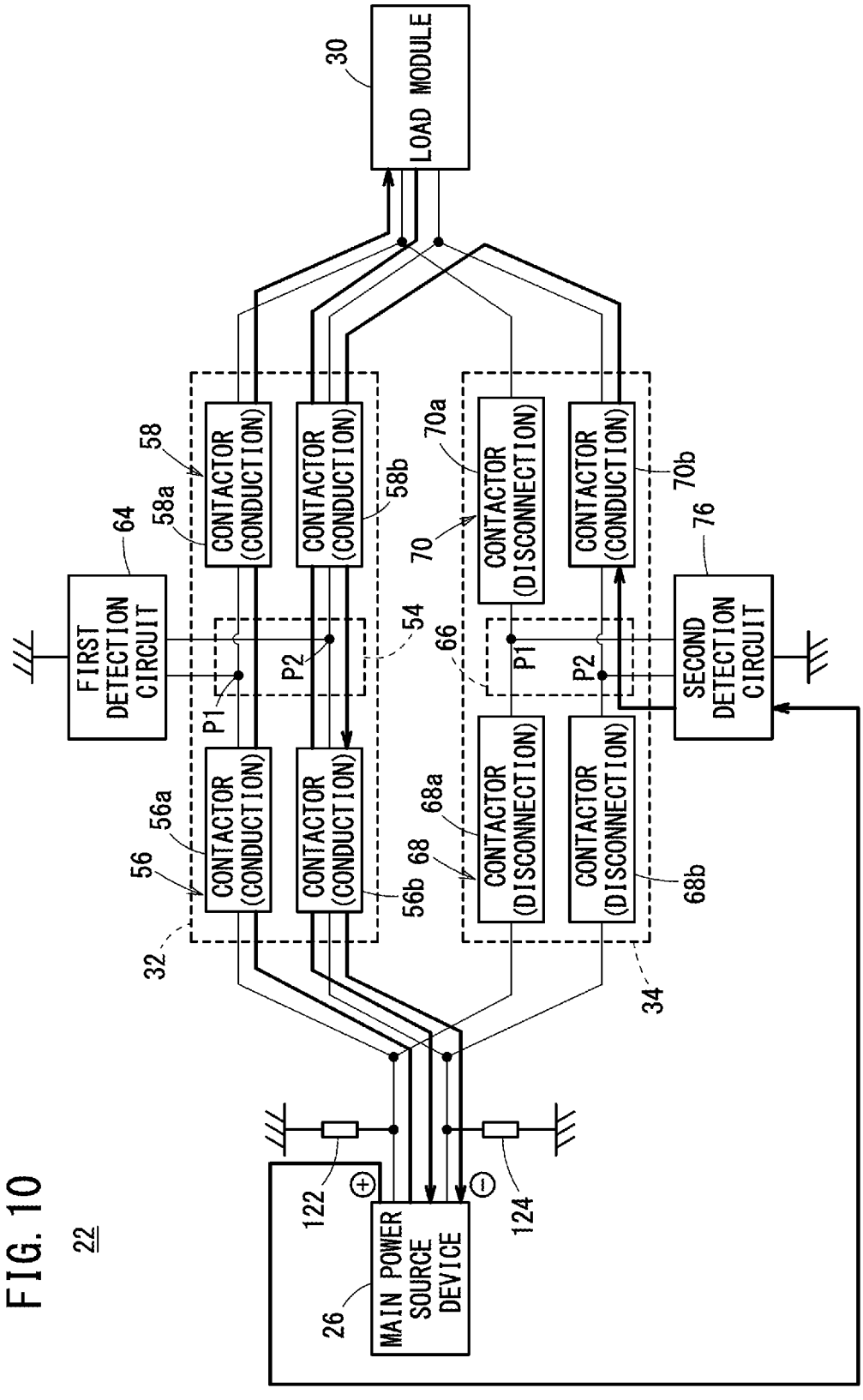
FIG. 10 is a schematic view of the power supply system.

In step S1 shown in FIG. 5, the capacitor 86 may be charged by a third method described below. FIG. 10 is a schematic view of the power supply system 22. Arrows shown in FIG. 10 indicate the flow of the current in the first power supply circuit 32, the second power supply circuit 34, and the second detection circuit 76. FIG. 10 shows a conduction path different from the conduction paths shown in FIGS. 6 and 8.

As described above, the circuit control unit 118 controls the on/off of the contactor device 68 and the contactor device 70 in order to charge the capacitor 86. Here, as shown in FIG. 10, in the second power supply circuit 34, only the contactor 70b is controlled to be in the conductive state. That is, each of the contactor 68a, the contactor 68b, and the contactor 70a is controlled to be in the disconnection state.

The circuit control unit 118 controls the on/off of each switch in order to charge the capacitor 86. Here, as shown in FIG. 7, the switching element 90 and the switching element 92 of the second detection circuit 76 are controlled to be in the conductive state. The switching element 88 and the switching element 94 of the second detection circuit 76 are controlled to be in the disconnection state.

Thus, the negative wire of the second power supply circuit 34 is connected to the reference potential. In this case, since the resistance value of the first resistor 103 is relatively large, a large current does not flow into the second detection circuit 76. The capacitor 86 of the second detection circuit 76 is charged with the DC power supplied to the second detection circuit 76. When the charging of the capacitor 86 is completed, no current flows through the second detection circuit 76. Therefore, the amount of electric power supplied from the power transmission bus 66 to the second detection circuit 76 can be suppressed.

[Method of Short Circuit Inspection]

In step S2 shown in FIG. 5, the short circuit inspection described below is performed. FIG. 11 is a schematic view of the power supply system 22. Arrows shown in FIG. 11 indicate the flow of the current in the first power supply circuit 32, the second power supply circuit 34, and the second detection circuit 76.

As described above, the circuit control unit 118 controls the on/off of the contactor device 68 and the contactor device 70 in order to perform the short circuit inspection. Here, as shown in FIG. 11, in the second power supply circuit 34, each of the contactor 68a, the contactor 68b, the contactor 70a, and the contactor 70b is controlled to be in the disconnection state. That is, the positive wire and the negative wire between the contactor device 68 and the contactor device 70 are electrically disconnected from the main power source device 26 and the load module 30.

Figure 12:
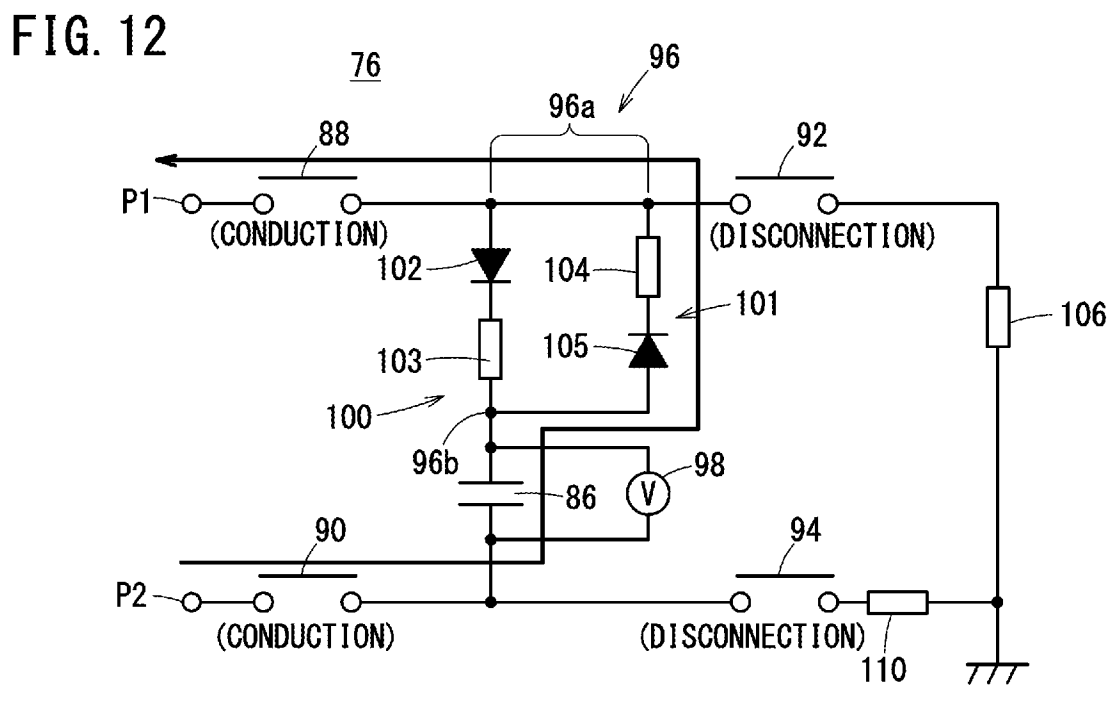

FIG. 12 is a circuit diagram of the second detection circuit 76. Arrows shown in FIG. 12 indicate the flow of the current in the second detection circuit 76. The circuit control unit 118 controls the on/off of each switch in order to perform the short circuit inspection. Here, as shown in FIG. 12, the switching element 88 and the switching element 90 of the second detection circuit 76 are controlled to be in the conductive state. Further, the switching element 92 and the switching element 94 of the second detection circuit 76 are controlled to be in the disconnection state. Thus, the positive wire and the negative wire of the second power supply circuit 34 are connected to each other via the second detection circuit 76. Further, the positive wire and the negative wire of the second power supply circuit 34 are disconnected from the reference potential.

Figures 13A, 13B:
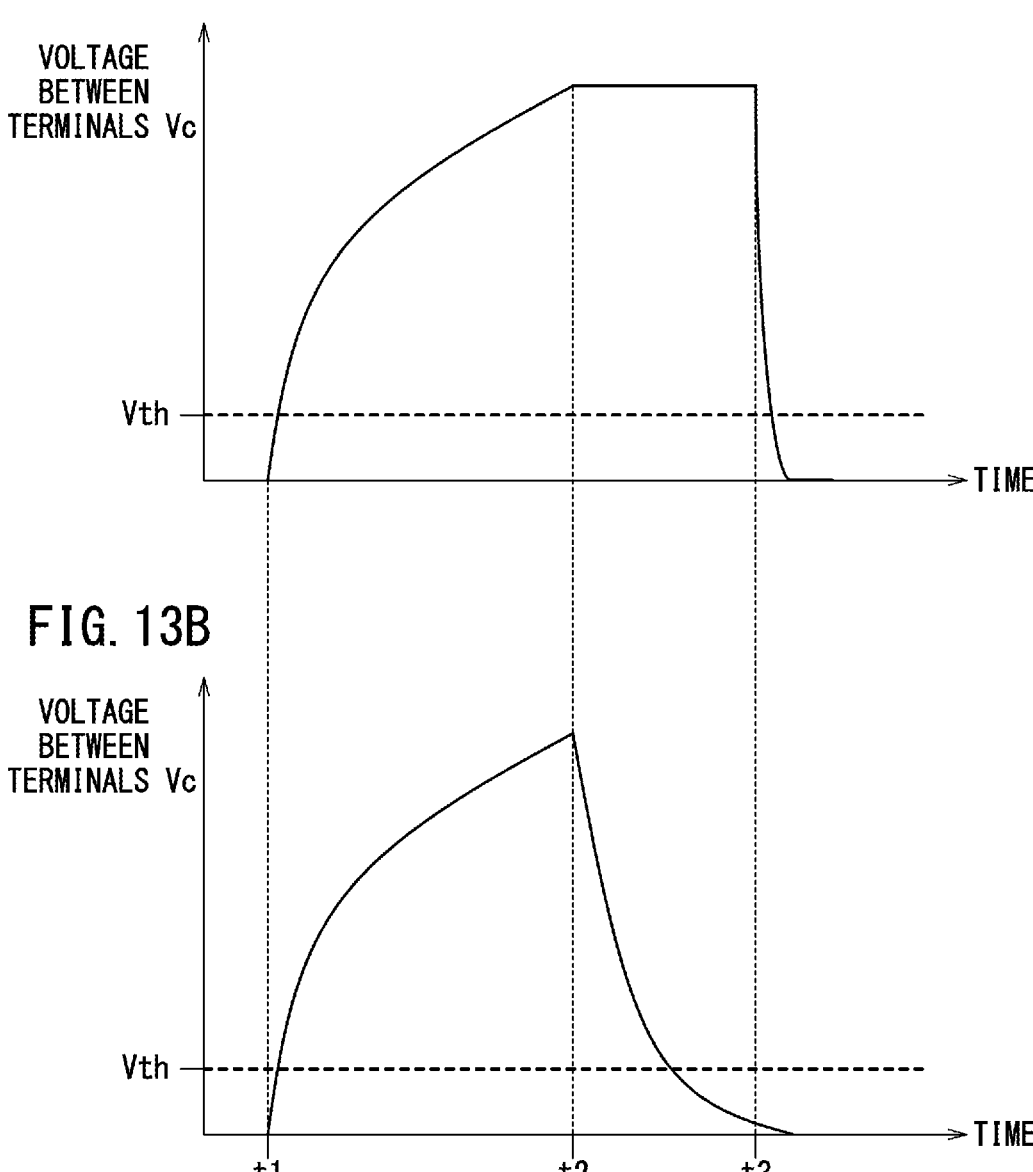
FIG. 13A is a graph showing a temporal change in the voltage between terminals of a capacitor.
FIG. 13B is a graph showing a temporal change in the voltage between the terminals of the capacitor.

FIG. 13A and FIG. 13B are graphs showing a temporal change in the voltage between the terminals of the capacitor 86. FIG. 13A shows a temporal change in the voltage between the terminals of the capacitor 86 when the positive wire and the negative wire are not short-circuited between the contactor device 68 and the contactor device 70. FIG.

13B shows a temporal change in the voltage between the terminals of the capacitor 86 when the positive wire and the negative wire are short-circuited between the contactor device 68 and the contactor device 70.

From a time point t1 to a time point t2, the capacitor 86 is charged. That is, the capacitor 86 is charged by any one of the first to third methods described above during the period from the time point t1 to the time point t2. The voltage between the terminals (Vc) of the capacitor 86 increases from the time point t1 to the time point t2.

At the time point t2, the charging of the capacitor 86 is terminated. The circuit control unit 118 controls the on/off of the contactor device 68 and the contactor device 70 as shown in FIG. 11. Further, the circuit control unit 118 controls the on/off of the switching element 88, the switching element 90, the switching element 92, and the switching element 94 as shown in FIG. 12.

When the positive wire and the negative wire are not short-circuited between the contactor device 68 and the contactor device 70, the first terminal and the second terminal of the capacitor 86 of the second detection circuit 76 are not electrically connected to each other (are not in the conductive state). Therefore, as shown in FIG. 13A, the voltage between the terminals (Vc) of the capacitor 86 does not substantially change immediately after the time point t2. On the other hand, when the positive wire and the negative wire are short-circuited between the contactor device 68 and the contactor device 70, the first terminal and the second terminal of the capacitor 86 of the second detection circuit 76 are electrically connected to each other (are in the conductive state). Thus, a closed circuit including the capacitor 86 and the second partial circuit 101 (the second resistor 104 and the second diode 105) is formed. Then, as shown in FIG. 12, a discharge current flows from the capacitor 86 as a power source. Therefore, as shown in FIG. 13B, the voltage between the terminals (Vc) of the capacitor 86 starts to decrease immediately after the time point t2.

The abnormality determination unit 120 detects the voltage between the terminals (Vc) of the capacitor 86 based on the detection result of the voltage sensor 98. The abnormality determination unit 120 determines the presence or absence of a short circuit based on the voltage between the terminals (Vc) at a time point t3 after a predetermined time from the time point t2. The abnormality determination unit 120 compares the voltage between the terminals (Vc) with a voltage threshold (Vth) stored in the storage unit 116 in advance. The voltage threshold (Vth) is a threshold for determining the presence or absence of a short circuit. When the voltage between the terminals (Vc) is equal to or greater than the voltage threshold (Vth), the abnormality determination unit 120 determines that the positive wire and the negative wire are not short-circuited between the contactor device 68 and the contactor device 70. On the other hand, when the voltage between the terminals (Vc) is less than the voltage threshold (Vth), the abnormality determination unit 120 determines that the positive wire and the negative wire are short-circuited between the contactor device 68 and the contactor device 70.

[Method of Discharging Capacitor]

Figure 14:
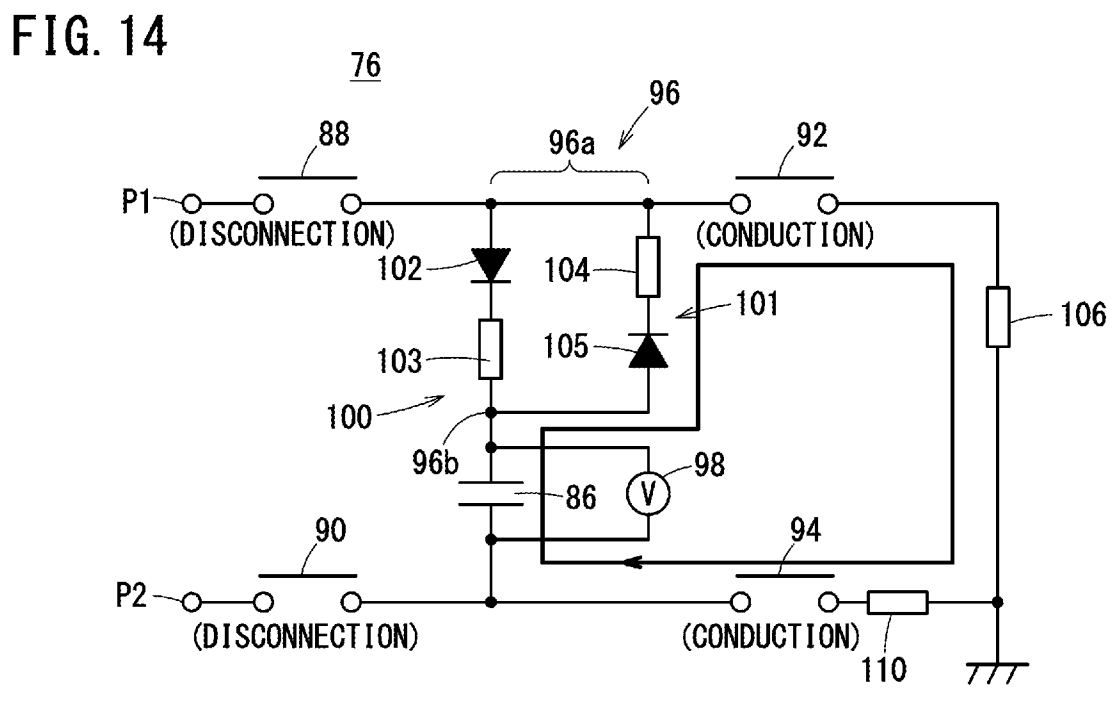

FIG. 14 is a circuit diagram of the second detection circuit 76. Arrows shown in FIG. 14 indicate the flow of the current in the second detection circuit 76. The circuit control unit 118 controls the on/off of each switch in order to discharge the capacitor 86. Here, as shown in FIG. 14, the switching element 92 and the switching element 94 of the second detection circuit 76 are controlled to be in the conductive state. The switching element 88 and the switching element 90 of the second detection circuit 76 are controlled to be in the disconnection state.

Thus, a closed circuit including the capacitor 86, the second partial circuit 101 (the second resistor 104 and the second diode 105), the third resistor 106, and the fourth resistor 110 is formed. Then, as shown in FIG. 14, a discharge current flows from the capacitor 86 as a power source. When the discharging of the capacitor 86 is started at the time point t3 shown in FIG. 13A, the voltage between the terminals (Vc) of the capacitor 86 starts to decrease. In this way, the capacitor 86 is discharged.

Effects of Present Embodiment

According to the present embodiment, a short circuit in the second power supply circuit 34 can be detected by the second detection circuit 76. If a short circuit of the second power supply circuit 34 is detected before using the second power supply circuit 34, use of the second power supply circuit 34 is avoided. As a result, it is possible to prevent a large current caused by the short circuit from flowing through the second power supply circuit 34.

According to the present embodiment, the second detection circuit 76 can perform ground fault detection and short circuit detection. In other words, the short circuit detection can be performed by the device for performing the ground fault detection. Therefore, the second power supply circuit 34 may not include a circuit element for detecting a short circuit. Therefore, according to the present embodiment, the weight and cost of the power supply system 22 can be reduced.

As described above, the computation unit 114 executes the short circuit inspection process for the second power supply circuit 34 in a state where DC power is supplied from the first power supply circuit 32 to the load module 30 and DC power is not supplied from the second power supply circuit 34 to the load module 30. Similarly, the computation unit 114 can execute the short circuit inspection process for the first power supply circuit 32 in a state where DC power is supplied from the second power supply circuit 34 to the load module 30 and DC power is not supplied from the first power supply circuit 32 to the load module 30.

The present invention is not limited to the above disclosure, and various modifications are possible without departing from the essence and gist of the present invention.

In the power supply system 22 of the present embodiment, the main power source device 26 includes the gas turbine 38, the generator 40, and the PCU 42. Instead, the main power source device 26 may include a battery or a capacitor.

In addition to the gas turbine 38, the generator 40, and the PCU 42, the main power source device 26 may include elements such as a sensor, a fuse, a relay, a breaker, a diode, a transistor, a resistor, a coil, and a capacitor.

In the power supply system 22 of the present embodiment, the auxiliary power source device 28 includes the battery 52. Instead, the auxiliary power source device 28 may include a gas turbine, a generator, and a PCU. Alternatively, the auxiliary power source device 28 may include a capacitor.

In addition to the battery 52, the auxiliary power source device 28 may include elements such as a sensor, a fuse, a relay, a breaker, a diode, a transistor, a resistor, a coil, and a capacitor.

The load module 30 may include elements such as a sensor, a fuse, a relay, a breaker, a diode, a transistor, a resistor, a coil, and a capacitor, in addition to the converter 46, the electric motor 48, and the inverter 50.

The first power supply circuit 32 may include elements such as a sensor, a fuse, a relay, a breaker, a diode, a transistor, a resistor, a coil, and a capacitor, in addition to the power transmission bus 54, the contactor devices 56, the contactor devices 58, the current sensors 60, and the current sensors 62.

The second power supply circuit 34 may include elements such as a sensor, a fuse, a relay, a breaker, a diode, a transistor, a resistor, a coil, and a capacitor, in addition to the power transmission bus 66, the contactor devices 68, the contactor devices 70, the current sensors 72, and the current sensors 74.

The auxiliary power supply circuit 36 may include elements such as a sensor, a fuse, a relay, a breaker, a diode, a transistor, a resistor, a coil, and a capacitor, in addition to the contactor device 78 and the current sensor 80.

The PCU 42 and the inverter 50 may each include a Y capacitor therein.

SUPPLEMENTARY NOTES

The following notes (appendices) are further disclosed in relation to the above-described embodiments.
Supplementary Note 1
The power supply system (22) includes: the power supply circuit (34) configured to supply, to the load device (30), DC power output from the power source device (26); and the detection circuit (76) configured to selectively perform ground fault detection and short circuit detection, wherein, in the ground fault detection, the detection circuit connects the power supply circuit to a ground via the capacitor (86) to detect whether or not the power supply circuit is short-circuited to the ground based on the voltage of the capacitor, and in the short circuit detection, the detection circuit connects, via the capacitor, the positive wire provided in the power supply circuit to the negative wire provided in the power supply circuit to detect whether or not the positive wire and the negative wire are short-circuited based on the voltage of the capacitor.

According to the above configuration, a short circuit in the power supply circuit can be detected by the detection circuit. If a short circuit of the power supply circuit is detected before using the power supply circuit, use of the power supply circuit is avoided. As a result, it is possible to prevent a large current caused by the short circuit from flowing through the power supply circuit.

According to the above configuration, the detection circuit can perform ground fault detection and short circuit detection. In other words, the short circuit detection can be performed by the device for performing the ground fault detection. Therefore, the power supply circuit may not include a circuit element for detecting a short circuit. Therefore, according to the above configuration, the weight and cost of the power supply system can be reduced. Thus, according to the above configuration, a satisfactory power supply system can be provided.
Supplementary Note 2
In the power supply system according to Supplementary Note 1, in the short circuit detection, the detection circuit may connect the positive wire to the negative wire via the capacitor after the capacitor is charged.
Supplementary Note 3
In the power supply system according to Supplementary Note 1 or 2, the capacitor may include a pair of terminals, the first terminal that is one of the pair of terminals may be connected to one of the positive wire or the negative wire via the resistor (103) and the first switch (88), the second terminal that is another of the pair of terminals may be connected to another of the positive wire or the negative wire via the second switch (90), the first terminal may be connected to the ground via the third switch (92), the second terminal may be connected to the ground via the fourth switch (94), and in the short circuit detection, the detection circuit may turn on the first switch and the second switch while turning off the third switch and the fourth switch.
Supplementary Note 4
In the power supply system according to Supplementary Note 3, the detection circuit may be configured to form a closed circuit including the capacitor, the third switch, the fourth switch, and the discharge resistor (104, 106, 110) by turning off the first switch and the second switch and turning on the third switch and the fourth switch, and the detection circuit may discharge the capacitor by forming the closed circuit after performing the short circuit detection.
Supplementary Note 5
In the power supply system according to any one of Supplementary Notes 1 to 4, the capacitor may include a pair of terminals, the first terminal that is one of the pair of terminals may be connected to one of the positive wire or the negative wire via the partial circuit (96) and the first switch, the second terminal that is another of the pair of terminals may be connected to another of the positive wire or the negative wire via the second switch, the first terminal may be connected to the ground via the partial circuit and the third switch, the second terminal may be connected to the ground via the fourth switch, the partial circuit may include the first partial circuit (100), and the second partial circuit (101) connected in parallel to the first partial circuit, the first partial circuit may include the first resistor (103) and the first diode (102) configured to allow a current to flow to the capacitor via the first resistor, and the second partial circuit may include the second resistor (104) and the second diode (105) configured to allow a current from the capacitor to flow via the second resistor.
Supplementary Note 6
The power supply system according to any one of Supplementary Notes 1 to 5 may further include the additional power supply circuit (32) configured to supply, to the load device, the DC power output from the power source device, and the detection circuit may perform the short circuit detection in a state where the DC power is supplied from the power source device to the load device via the additional power supply circuit and the DC power is not supplied from the power source device to the load device via the power supply circuit.
Supplementary Note 7
The moving object (10) includes the power supply system according to any one of Supplementary Notes 1 to 6.

The invention claimed is:
1. A power supply system comprising:
a power supply circuit configured to supply, to a load device, direct current electric power output from a power source device; and
a detection circuit configured to selectively perform ground fault detection and short circuit detection, wherein, in the ground fault detection, the detection circuit connects the power supply circuit to a ground via a capacitor to detect whether or not the power supply circuit is short-circuited to the ground based on a voltage of the capacitor, and in the short circuit detection, the detection circuit connects, via the capacitor, a positive wire provided in the power supply circuit to a negative wire provided in the power supply circuit to detect whether or not the positive wire and the negative wire are short-circuited based on the voltage of the capacitor.

2. The power supply system according to claim 1, wherein in the short circuit detection, the detection circuit connects the positive wire to the negative wire via the capacitor after the capacitor is charged.

3. The power supply system according to claim 1, wherein the capacitor includes a pair of terminals, a first terminal that is one of the pair of terminals is connected to one of the positive wire or the negative wire via a resistor and a first switch, a second terminal that is another of the pair of terminals is connected to another of the positive wire or the negative wire via a second switch, the first terminal is connected to the ground via a third switch, the second terminal is connected to the ground via a fourth switch, and in the short circuit detection, the detection circuit turns on the first switch and the second switch while turning off the third switch and the fourth switch.

4. The power supply system according to claim 3, wherein the detection circuit is configured to form a closed circuit including the capacitor, the third switch, the fourth switch, and a discharge resistor by turning off the first switch and the second switch and turning on the third switch and the fourth switch, and the detection circuit discharges the capacitor by forming the closed circuit after performing the short circuit detection.

5. The power supply system according to claim 1, wherein the capacitor includes a pair of terminals, a first terminal that is one of the pair of terminals is connected to one of the positive wire or the negative wire via a partial circuit and a first switch, a second terminal that is another of the pair of terminals is connected to another of the positive wire or the negative wire via a second switch, the first terminal is connected to the ground via the partial circuit and a third switch, the second terminal is connected to the ground via a fourth switch, the partial circuit includes a first partial circuit, and a second partial circuit connected in parallel to the first partial circuit, the first partial circuit includes a first resistor, and a first diode configured to allow a current to flow to the capacitor via the first resistor, and the second partial circuit includes a second resistor, and a second diode configured to allow a current from the capacitor to flow via the second resistor.

6. The power supply system according to claim 1, further comprising an additional power supply circuit configured to supply, to the load device, the direct current electric power output from the power source device, wherein the detection circuit performs the short circuit detection in a state where the direct current electric power is supplied from the power source device to the load device via the additional power supply circuit and the direct current electric power is not supplied from the power source device to the load device via the power supply circuit.

7. A moving object comprising the power supply system according to claim 1.

* * * * *